United States Patent
Portmann

[11] 3,768,887
[45] Oct. 30, 1973

[54] WATCH OR CLOCK COVER GLASS INCLUDING A LIQUID DISPLAY DEVICE

[75] Inventor: Hubert F. Portmann, Saint-Imier, Switzerland

[73] Assignee: Compagnie des Montres Longines, Berne, Switzerland

[22] Filed: Aug. 9, 1971

[21] Appl. No.: 170,096

[30] Foreign Application Priority Data
Sept. 16, 1970 Switzerland.................. 13708/70

[52] U.S. Cl. .............. 350/160 LC, 58/50 A, 58/91
[51] Int. Cl. ............................................. G02f 1/16
[58] Field of Search............... 350/160 LC, 267; 58/50 R, 50 A, 91; 240/1 EL; 340/324 R

[56] References Cited
UNITED STATES PATENTS
3,499,112  3/1970  Heilmeier et al............ 350/160 LC
2,847,970  8/1958  Smith............................... 240/1 EL Primary Examiner—Ronald L. Wibert
Assistant Examiner—Ronald J. Stern
Attorney—Imirie & Smiley

[57] ABSTRACT

A watch or clock cover glass including a liquid crystal and having a rear electrode acting as a mirror, characterised by a surface absorbing light, so disposed that it permits observation of the display zone, the incident light around the display zone being directed onto the said surface by means of at least one inclined optical surface.

10 Claims, 4 Drawing Figures

WATCH OR CLOCK COVER GLASS INCLUDING A LIQUID DISPLAY DEVICE

BACKGROUND OF THE INVENTION

In order that a watch or clock cover glass incorporating a liquid crystal is satisfactory from the point of view of display contrast, it is necessary to direct the incident light so that it is not reflected into the eyes of the spectator. The latter should be able to observe the time display elements on a black background. However, an activated display element becomes translucent and, for this reason, disperses the incident light in all directions, including the direction of the spectator, who thus sees this element illuminated on a black background.

The object of the present invention is to provide a display device conforming to the above mentioned conditions.

SUMMARY OF THE INVENTION

According to the present invention there is provided a watch or clock cover glass including a liquid crystal and having a rear electrode acting as a mirror, characterised by a surface absorbing light, so disposed that it permits observation of the display zone, the incident light around the display zone being directed onto the said surface by means of at least one inclined optical surface.

DETAILED DESCRIPTION OF THE INVENTION

Figure 1:
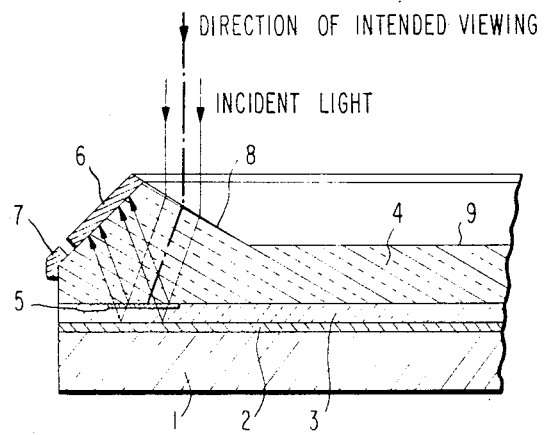
FIG. 1 is a section of a first embodiment and
FIGS. 2, 3 and 4 are similar sections through a other embodiments.

The display device according to FIG. 1 which is a watch or clock glass has a rear support 1 carrying an electrode 2 acting as a mirror. The electrode 2 is covered with a layer 3 of liquid crystal. A glass 4 with transparent electrodes 5 having the form of the signs to be displayed, covers the layer 3. An inclined outer surface of the glass 4 is covered with a layer 6 absorbing light. Beside this layer 6 a layer 7 of luminescent matter is applied to illuminate the display zone near the electrodes 5. Opposite the electrodes 5 there is an outer surface 8 that is inclined to the central planar outer surface 9 of the glass.

The incident light which falls onto the glass 4 where the lines and arrows indicate, is directed towards the display zone to be viewed by an observer, passes through the normally transparent liquid crystal and is reflected by the mirror 2 towards the absorbing zone 6. To a spectator, the display zone thus appears practically black. When an electrode 5 is activated, the liquid crystal below this electrode becomes transluscent and disperses the incident light in all directions. The activated sign or signs are now seen illuminated on a black background with adequate contrast.

The device represented may be of any shape, circular or rectangular for example and the electrodes 5 may indicate the time of day in any desired manner or form.

Figure 2:
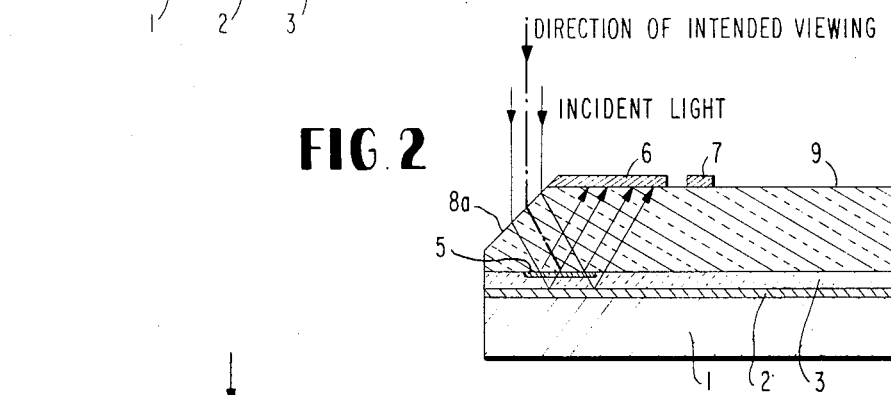

The embodiment shown in FIG. 2 is different from that of FIG. 1 in that the outer surface of the glass 4 has a periphery 8a which acts as a prism. The layers 6 and 7 are carried on a part parallel to the plane of the display zone.

The plane outer surface 9 of the glass 4 may be roughened to disperse the incident light and direct it partly towards the display zone.

Figure 3:
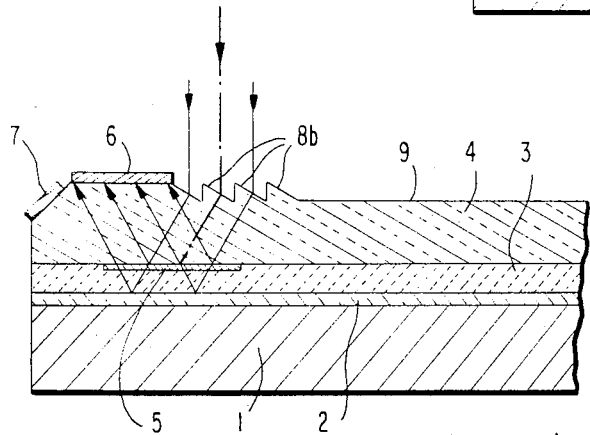

The devices illustrated make it possible to obtain the desired optical characteristics by means of a thin assembly which maybe used as a watch glass. The thickness may be even more reduced if the surfaces 8 are divided into several elements to form a stepped prism or Fresnel lens having a plurality of inclined surfaces 8b as shown in FIG. 3.

Figure 4:
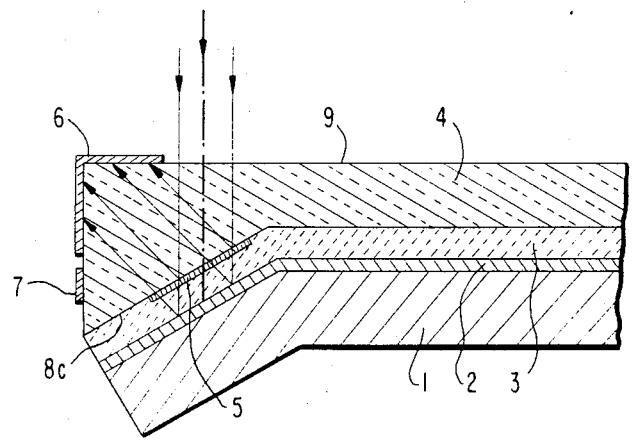

Instead of, or in addition to, the inclined surfaces 8 on the glass 4, the appropriate parts of the mirror 2 may be inclined to obtain similar optical effects. The mirror and the layer of liquid crystal may be inclined at their outer portions to engage an inclined inner surface 8c of the glass 4 as shown in FIG. 4.

We claim:

1. A unitary timepiece cover glass comprising:
   a rear electrode having a mirror surface,
   a liquid crystal engaged with and overlying said mirror surface,
   a transparent glass member having an exposed outer surface and an inner surface engaged with and overlying the surface of said liquid crystal opposite said electrode, the central areas of said glass member outer surface and said mirror surface being planar and parallel,
   patterned transparent electrode means of limited area interposed between portions of said liquid crystal and glass member, and
   a light absorbing layer on a first portion of said outer surface of said glass member substantially opposite the area of said patterned electrode means,
   said outer surface having a second portion that will direct light which is propagating in a direction substantially perpendicular to said central area to a peripheral area of said mirror surface opposite said patterned electrode means,
   said second portion of said outer surface and said peripheral area of said mirror surface being relatively inclined and said light absorbing layer and said patterned electrode means being positioned such that when said liquid crystal is in a transparent state said incident light is directed to said mirror surface peripheral area and reflected thereby through said patterned electrode to said light absorbing layer but upon activation of said electrodes said liquid crystal is rendered reflective and disperses light back through said patterned electrode to said portion of said outer surface to be viewed by an observer.

2. A cover glass according to claim 1 wherein said mirror surface including said peripheral area is planar and said glass member outer surface second portion is inclined to said central area thereof.

3. A cover glass according to claim 2 wherein said second portion of said glass member outer surface is of stepped form and includes a plurality of inclined surfaces.

4. A cover glass according to claim 1 wherein said second portion and central area of said outer surface of said glass member are coplanar and said peripheral area of said mirror surface is inclined to said glass member outer surface.

5. A cover glass according to claim 1 wherein said light absorbing layer is immediately adjacent said second portion of said glass member outer surface.

6. A cover glass according to claim 5 wherein said light absorbing layer and said second portion of said glass member outer surface are inclined relative to each other.

7. A cover glass according to claim 5 wherein said light absorbing layer is on a plane parallel with said central area of said outer surface.

8. A cover glass according to claim 1 wherein said second portion of said glass member outer surface and said light absorbing layer completely surround said outer surface central area.

9. A cover glass according to claim 1 comprising a luminescent material on a limited area of said glass member.

10. A cover glass according to claim 9 wherein said luminescent material comprises a layer on said glass member outer surface adjacent said light absorbing layer.

* * * * *

UNITED STATES PATENT OFFICE
CERTIFICATE OF CORRECTION

Patent No. 3,768,887     Dated October 30, 1973

Inventor(s) Hubert Portmann

It is certified that error appears in the above-identified patent and that said Letters Patent are hereby corrected as shown below:

In the Heading:

Assignee's name should be: Compagnie des Montres Longines, Francillon S A.

Assignee's address should be: Saint-Imier, in the canton of Berne, Switzerland

Signed and sealed this 9th day of July 1974.

(SEAL)
Attest:

McCOY M. GIBSON, JR.
Attesting Officer

C. MARSHALL DANN
Commissioner of Patents